US012202530B2

(12) United States Patent
Shi et al.

(10) Patent No.: US 12,202,530 B2
(45) Date of Patent: Jan. 21, 2025

(54) INTERMEDIATE CAR ELECTRIC COUPLER CONTROL CIRCUIT FOR SUBWAY VEHICLE

(71) Applicant: CRRC Nanjing Puzhen Co., Ltd., Nanjing (CN)

(72) Inventors: Rui Shi, Nanjing (CN); Zhi Chen, Nanjing (CN); Fan Yang, Nanjing (CN); Xingwen Wang, Nanjing (CN); Juxing Liang, Nanjing (CN); Le Wang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 796 days.

(21) Appl. No.: 17/436,084

(22) PCT Filed: Nov. 11, 2020

(86) PCT No.: PCT/CN2020/128068
§ 371 (c)(1),
(2) Date: Sep. 3, 2021

(87) PCT Pub. No.: WO2022/088257
PCT Pub. Date: May 5, 2022

(65) Prior Publication Data

US 2022/0348237 A1 Nov. 3, 2022

(30) Foreign Application Priority Data

Nov. 2, 2020 (CN) ......................... 202011200808.6

(51) Int. Cl.
*B61G 5/10* (2006.01)
*B61G 7/14* (2006.01)
(Continued)

(52) U.S. Cl.
CPC ................. *B61G 5/10* (2013.01); *B61G 7/14* (2013.01); *H01H 9/30* (2013.01); *B61L 15/0036* (2013.01)

(58) Field of Classification Search
CPC ... B61G 5/00; B61G 5/06; B61G 5/10; B61G 7/00; B61G 7/14; B61G 15/0036; B61L 15/0036; H01H 9/00; H01H 9/30
(Continued)

(56) References Cited

U.S. PATENT DOCUMENTS 5,152,410 A 10/1992 Ta et al.

FOREIGN PATENT DOCUMENTS

CN 103318193 A 9/2013
CN 103863352 A 6/2014
(Continued)

*Primary Examiner* — Zachary L Kuhfuss
*Assistant Examiner* — Heaven R Buffington
(74) *Attorney, Agent, or Firm* — Bayramoglu Law Offices LLC

(57) ABSTRACT

An intermediate car electric coupler control circuit for a subway vehicle includes a coupling state relay, a power supply circuit for a decoupling electromagnetic valve, a first power supply circuit for an electric coupler control relay, a second power supply circuit for an air path and electric coupler module control electromagnetic valve, and a third power supply circuit for a bus control contactor. A coupler coupling operation is performed exactly according to a sequence of a mechanical coupling, an air path conduction, an electric coupler extension, and a medium- and low-voltage bus closing, wherein contacts of electric couplers are prevented from being damaged. A coupler decoupling operation is performed exactly according to a sequence of a contact heavy-current removal, an electric coupler withdrawal, an air path disconnection and a mechanical decou-
(Continued)

pling, wherein the contacts are prevented from being damaged by a heavy current arcing and a discharge.

10 Claims, 1 Drawing Sheet

(51) Int. Cl.
*H01H 9/30* (2006.01)
*B61L 15/00* (2006.01)
(58) Field of Classification Search
USPC .................................................... 213/1.3, 1.6
See application file for complete search history.

(56) References Cited

FOREIGN PATENT DOCUMENTS

| | | | | | |
|---|---|---|---|---|---|
| CN | 104097656 A | | 10/2014 | | |
| CN | 106394596 A | | 2/2017 | | |
| CN | 108032867 A | * | 5/2018 | ............... | B61G 7/00 |
| CN | 111055876 A | | 4/2020 | | |
| KR | 20100089446 A | | 8/2010 | | |

* cited by examiner

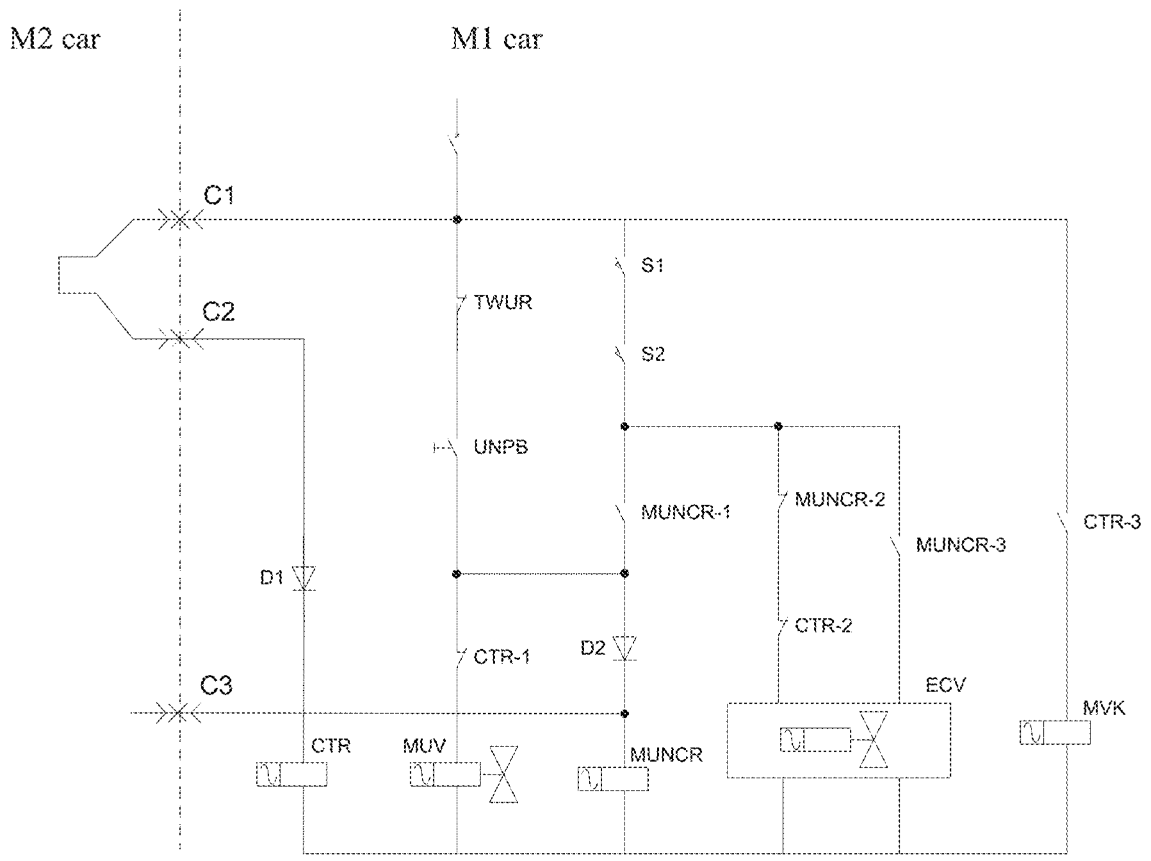
M2 car
M1 car
C1
C2
C3
TWUR
UNPB
S1
S2
MUNCR-1
MUNCR-2
MUNCR-3
CTR-3
D1
D2
CTR-1
CTR-2
ECV
MVK
CTR
MUV
MUNCR

INTERMEDIATE CAR ELECTRIC COUPLER CONTROL CIRCUIT FOR SUBWAY VEHICLE

CROSS REFERENCE TO THE RELATED APPLICATIONS

This application is the national stage entry of International Application No. PCT/CN2020/128068, filed on Nov. 11, 2020, which is based upon and claims priority to Chinese Patent Application No. 202011200808.6 filed on Nov. 2, 2020, the entire contents of which are incorporated herein by reference.

TECHNICAL FIELD

The present invention relates to a coupler control circuit for a railway vehicle, and belongs to the technical field of full-automatic coupler electrical control.

BACKGROUND

At present, most of the subway projects adopt a full-automatic coupler+electric coupler method for coupling rescue of cars, and the coupling and marshalling of the cars are achieve by a jumper wire+semi-permanent (or semi-automatic coupler) method. The coupling and decoupling control of couplers is provided by coupler providers, and correspondingly, most of the control circuits perform mechanical and air path control without combining with the vehicle circuit to control the operation of the couplers. In addition, only control signals and communication signals pass through the contacts of the electric couplers, the through-current in the contacts is small, and the voltage level is not high, so that even if the electric couplers are decoupled accidentally or bad contacted, the phenomenon of burning at the electric contacts caused by large-area large-current arcing and discharge, which destroys the electric couplers, will not occur. The contact circuit of full-automatic couplers is mostly used in rescue coupling in conventional projects, and the use time is short, so electrical requirements on the contacts of the circuit are lower, and the problems such as contact arcing and discharge caused by bad contact or accidental decoupling of the coupler contacts are not considered.

The existing full-automatic coupler is mainly used at the B end of a head car of a subway vehicle, and is used for rescuing and coupling a metro car. There are mainly two control methods, one is air path control while the other is circuit control. The defects are as follows: 1. The air path control scheme can achieve automatic coupling and decoupling of the electric coupler in the full-automatic couplers, but it cannot be combined with the vehicle control circuit to provide functions such as vehicle bus load removal and the like. It is only suitable for use in full-automatic couplers for head cars. 2. The circuit control scheme can achieve automatic coupling and decoupling of the electric coupler in the full-automatic couplers by building a vehicle logic circuit, but it is only used in the full-automatic couplers for head cars at present for application scenarios of coupling rescue of cars. It is not applied to full-automatic couplers of intermediate cars, and the removal function for a high-load and high-voltage train line is not considered. In the case of accidental decoupling of electric couplers or separation of the contacts of the electric couplers in vibration, arcing and discharge may occur at the contacts and burn the contacts, which, in some serious cases, even make the electric couplers or the cars get on fire.

With the development of intelligent operation and maintenance, and driverless technologies, and the requirements of subway companies on maintenance cost and convenience are more and more stringent. The functional requirements of flexible marshalling and recoupling operation of metro cars and flexible replacement of marshalling units are also put into agenda. This requires to replace jumper wires of intermediate cars by electric coupler contacts, and connect medium voltage buses and low voltage buses of the train by electric couplers. Therefore, an electric coupler control circuit in a full-automatic coupler is required to have the functions of full-automatic coupling control and prevention of arcing and discharge at bus contacts.

SUMMARY

A main object of the present invention is to solve the problem of automatic coupling and decoupling circuit control of electric couplers in the prior art and the problem of high-current high-voltage arcing and discharge at contacts of electric couplers caused by accidental decoupling and bad contact, and provides an intermediate car electric coupler control circuit for a subway vehicle. In order to solve the technical problem described above, the present invention provides an intermediate car electric coupler control circuit for a subway vehicle, which comprises the following parts.

1. A coupling state relay provided in series in a coupler coupling line having a first full-automatic coupler electric contact and a second full-automatic coupler electric contact.

2. A power supply circuit for a decoupling electromagnetic valve, comprising a normally-closed contact of a wake-up relay, a decoupling button switch, and a first normally-closed contact of the coupling state relay which are sequentially connected in series between a train power supply and the decoupling electromagnetic valve.

3. A power supply circuit for an electric coupler control relay, comprising mechanical coupler position switches and a first normally-open contact of the electric coupler control relay which are sequentially connected in series between the train power supply and the electric coupler control relay, a high-potential terminal of the electric coupler control relay being connected to a low-potential terminal of the decoupling button switch through a wire.

4. A power supply circuit for an air path and electric coupler module control electromagnetic valve, which is provided with two power supply electronic circuits which are connected in parallel to low-potential terminals of the mechanical coupler position switches, the first power supply electronic circuit comprising a normally-closed contact of the electric coupler control relay and a second normally-closed contact of the coupling state relay which are connected in series; the second power supply circuit comprising a second normally-open contact of the electric coupler control relay.

5. A power supply circuit for a bus control contactor, comprising a second normally-open contact of the coupling state relay connected in series between the train power supply and the bus control contactor.

The present invention also provides a subway vehicle, characterized by comprising an intermediate car electric coupler control circuit for a subway vehicle as described above.

The invention has the following beneficial effects: the coupler coupling operation is performed exactly according to a sequence of mechanical coupling, air path conduction, electric coupler extension, and medium- and low-voltage bus closing, so that the contacts of the electric couplers are prevented from being damaged. The coupler decoupling operation is performed exactly according to a sequence of contact heavy-current removal, electric coupler withdrawal, air path disconnection and mechanical decoupling, so that the contacts are prevented from being damaged by heavy current arcing and discharge. In the operation of the vehicle, if accidental decoupling or bad contact of the electric contacts of the electric couplers occurs, the medium- and low-voltage buses in the electric contacts of the electric couplers can be disconnected through the control circuit, thereby preventing large current arcing and discharge.

BRIEF DESCRIPTION OF THE DRAWINGS

FIGURE shows a schematic diagram of an intermediate car electric coupler control circuit for a subway vehicle according to the present invention.

DETAILED DESCRIPTION OF THE EMBODIMENTS

Embodiments of the present invention will now be described with reference to the accompanying drawings.

As shown in the FIGURE, an embodiment of the present invention provides an intermediate car electric coupler control circuit for a subway vehicle, comprising:

- a coupling state relay CTR provided in series in a coupler coupling line having a first full-automatic coupler electric contact C1 and a second full-automatic coupler electric contact C2;
- a power supply circuit for a decoupling electromagnetic valve MUV, comprising a normally-closed contact TWUR of a wake-up relay, a decoupling button switch UNPB, and a first normally-closed contact CTR-1 of the coupling state relay which are sequentially connected in series between a train power supply and the decoupling electromagnetic valve MUV;
- a power supply circuit for an electric coupler control relay MUNCR, comprising a first mechanical coupler position switch S1, a second mechanical coupler position switch S2, and a first normally-open contact MUNCR-1 of the electric coupler control relay which are sequentially connected in series between the train power supply and the electric coupler control relay MUNCR, a high-potential terminal of the electric coupler control relay MUNCR being connected to a low-potential terminal of the decoupling button switch UNPB through a wire;
- a power supply circuit for an air path and electric coupler module control electromagnetic valve ECV, which is provided with two power supply electronic circuits which are connected in parallel to a low-potential terminal of the second mechanical coupler position switch S2, the first power supply electronic circuit comprising a normally-closed contact MUNCR-2 of the electric coupler control relay and a second normally-closed contact CTR-2 of the coupling state relay which are connected in series; the second power supply circuit comprising a second normally-open contact MUNCR-3 of the electric coupler control relay; and
- a power supply circuit for a bus control contactor MVK, comprising a normally-open contact CTR-3 of the coupling state relay connected in series between the train power supply and the bus control contactor MVK.

The high-potential terminal of the electric coupler control relay MUNCR is connected with an electric coupler control relay MUNCR of an opposite car through a third full-automatic coupler contact C3; and a first diode D1 is connected in series between the second full-automatic coupler electric contact C2 and the coupling state relay CTR. A second diode D2 is provided on a line from the low-potential terminal of the decoupling button switch UNPB to the high-potential terminal of the electric coupler control relay MUNCR.

Among others, the first mechanical coupler position switch S1 and the second mechanical coupler position switch S2 are limit switches, and also may be position sensors.

The coupler coupling control method is as follows:

For a subway vehicle with intermediate cars having full-automatic couplers mounted thereon, after mechanical coupler coupling is complete, the first mechanical coupler position switch S1 and the second mechanical coupler position switch S2 are closed, and as the electric couplers are not completely coupled, the first full-automatic coupler electric contact C1, the second full-automatic coupler electric contact C2 and the third full-automatic coupler electric contact C3 are opened. The air path and electric coupler module control electromagnetic valve ECV is electrified, and an air path connecting module and an electric coupler connecting module are pushed out to complete air path connection and electric coupler contact connection. After the electric coupler contacts are connected, the first full-automatic coupler electric contact C1, the second full-automatic coupler electric contact C2 and the third full-automatic coupler electric contact C3 are closed, the coupling state relay CTR is electrified, the second normally-closed contact CTR-2 of the coupling state relay is opened, and the air path and electric coupler module control electromagnetic valve ECV is not electrified, so that the electromagnetic valve ECV is prevented from being electrified continuously. Meanwhile, the bus control contactor MVK is electrified, and the medium- and low-voltage buses are connected. Therefore, the coupler coupling is performed exactly according to a sequence of mechanical coupling, air path conduction, electric coupler extension, and medium- and low-voltage bus closing, so that the contacts of the electric couplers are effectively prevented from being damaged.

The coupler decoupling control method is as follows:

As the normally-closed contact TWUR of the wake-up relay is serially connected in a decoupling circuit, the decoupling button switch UNPB cannot be operated for decoupling in the wake-up state of the vehicle, and load current existing in the intermediate electric contacts in the decoupling process is preventing. When the vehicle sleeps, the medium- and low-voltage buses are powered off, the wake-up relay is not electrified, and the normally-closed contact TWUR of the wake-up relay is closed. The control power supply of the control circuit of the present invention is provided by permanent power, and as the contacts of the electric couplers are not separated at the moment, the coupling state relay CTR is electrified, the normally-closed contact CTR-1 of the coupling state relay is opened, and the decoupling electromagnetic valve MUV is not electrified; and the decoupling button switch UNPB is pressed down such that the electric coupler control relays MUNCR of the M1 car and the M2 car are electrified simultaneously, the second normally-open contact MUNCR-3 of the electric coupler control relay is closed, the air path and electric coupler module control electromagnetic valves ECV of both cars are electrified, the electric coupler and air path interfaces of the two cars are withdrawn simultaneously, the first full-automatic coupler electric contact C1, the second full-automatic coupler electric contact C2 and the third full-automatic coupler electric contact C3 are opened, the coupling state relay CTR is not electrified, the first normally-closed contact CTR-1 of the coupling state relay is closed, the mechanical decoupling electromagnetic valve MUV is electrified, a mechanical coupling lock catch is opened, the first mechanical coupler position switch S1 and the second mechanical coupler position switch S2 are opened after the mechanical couplers are completely separated, and the power supply of the whole control circuit is cut off, thereby completing the decoupling process. The coupler decoupling operation is performed exactly according to a sequence of heavy-current removal, electric coupler withdrawal, air path disconnection and mechanical decoupling, thereby completing the decoupling operation.

The method for controlling accidental decoupling and bad contact of the contacts is as follows: During operation of the vehicle, when accidental decoupling or bad electric contact of the electric couplers occurs, the first full-automatic electric contact C1 and the second full-automatic electric contact C2 of the electric coupler are opened, the coupling state relay CTR is not electrified, the bus control contactor MVK is not electrified, and the current in the medium- and low-voltage buses is cut off, so that the current in the medium- and low-voltage buses are prevented from being cut off by the electric contacts of the medium- and low-voltage buses, thereby preventing large-current arcing.

In addition to the embodiments described above, other embodiments of the invention are possible.

All technical solutions formed by equivalent replacements or equivalent transformations fall within the protection scope of the present invention.

What is claimed is:

1. An intermediate car electric coupler control circuit for a subway vehicle, comprising a coupling state relay (CTR) provided in series in a coupler coupling line having a first full-automatic coupler electric contact (C1) and a second full-automatic coupler electric contact (C2);

a first power supply circuit for a decoupling electromagnetic valve (MUV), comprising a normally-closed contact (TWUR) of a wake-up relay, a decoupling button switch (UNPB), and a first normally-closed contact (CTR-1) of the coupling state relay, wherein the normally-closed contact (TWUR) of the wake-up relay, the decoupling button switch (UNPB) and the first normally-closed contact (CTR-1) of the coupling state relay are sequentially connected in series between a train power supply and the decoupling electromagnetic valve (MUV);

a second power supply circuit for an electric coupler control relay (MUNCR), comprising mechanical coupler position switches (S1, S2) and a first normally-open contact (MUNCR-1) of the electric coupler control relay wherein the mechanical coupler position switches (S1, S2) and the first normally-open contact (MUNCR-1) are sequentially connected in series between the train power supply and the electric coupler control relay (MUNCR), a high-potential terminal of the electric coupler control relay (MUNCR) is connected to a low-potential terminal of the decoupling button switch (UNPB) through a wire;

a third power supply circuit for an air path and an electric coupler module control electromagnetic valve (ECV), comprising a first power supply electronic circuit and a second power supply electronic circuit, wherein the first power supply electronic circuit and the second power supply electronic circuit are connected in parallel to low-potential terminals of the mechanical coupler position switches (S1, S2), the first power supply electronic circuit comprises a normally-closed contact (MUNCR-2) of the electric coupler control relay and a second normally-closed contact (CTR-2) of the coupling state relay connected in series; the second power supply electronic circuit comprises a second normally-open contact (MUNCR-3) of the electric coupler control relay; and a fourth power supply circuit for a bus control contactor (MVK), comprising a third normally-open contact (CTR-3) of the coupling state relay connected in series between the train power supply and the bus control contactor (MVK).

2. The intermediate car electric coupler control circuit according to claim 1, wherein the high-potential terminal of the electric coupler control relay (MUNCR) is connected with the electric coupler control relay (MUNCR) of an opposite car through a third full-automatic coupler contact (C3).

3. The intermediate car electric coupler control circuit according to claim 1, wherein a first diode (D1) is connected in series between the second full-automatic coupler electric contact (C2) and the coupling state relay (CTR).

4. The intermediate car coupler control circuit according to claim 1, wherein a second diode (D2) is provided on a line from the low-potential terminal of the decoupling button switch (UNPB) to the high-potential terminal of the electric coupler control relay (MUNCR).

5. The intermediate car electric coupler control circuit according to claim 1, wherein the mechanical coupler position switches (S1, S2) are limit switches or position sensors.

6. A train, comprising an intermediate car electric coupler control circuit for a subway vehicle according to claim 1.

7. The train according to claim 6, wherein the high-potential terminal of the electric coupler control relay (MUNCR) is connected with the electric coupler control relay (MUNCR) of an opposite car through a third full-automatic coupler contact (C3).

8. The train according to claim 6, wherein a first diode (D1) is connected in series between the second full-automatic coupler electric contact (C2) and the coupling state relay (CTR).

9. The train according to claim 6, wherein a second diode (D2) is provided on a line from the low-potential terminal of the decoupling button switch (UNPB) to the high-potential terminal of the electric coupler control relay (MUNCR).

10. The train according to claim 6, wherein the mechanical coupler position switches (S1, S2) are limit switches or position sensors.

* * * * *